(12) United States Patent
Beer

(10) Patent No.: US 6,415,564 B1
(45) Date of Patent: Jul. 9, 2002

(54) ARRANGEMENT FOR FASTENING A GRILLE IN A FRAME SECTION

(75) Inventor: Christian Beer, Dornbirn (AT)

(73) Assignee: Heron Sondermaschinen und Steuerungen GmbH, Lustenau (AT)

(*) Notice: Subject to any disclaimer, the term of this patent is extended or adjusted under 35 U.S.C. 154(b) by 0 days.

(21) Appl. No.: 09/527,741

(22) Filed: Mar. 17, 2000

(30) Foreign Application Priority Data

Apr. 30, 1999 (DE) .......................................... 199 19 631

(51) Int. Cl.⁷ ............................................... E06B 3/964
(52) U.S. Cl. ................... 52/204.61; 52/665; 52/745.21; 256/47; 256/54
(58) Field of Search ............................. 52/656.8, 507, 52/660, 665, 676, 204.61, 745.21; 49/50, 57; 211/94.01, 106, 181.1; 403/217, 396, 280, 174, 326, 329, 344; 256/47, 54, 24

(56) References Cited

U.S. PATENT DOCUMENTS

| | | | | |
|---|---|---|---|---|
| 3,164,054 A | * | 1/1965 | Biesecker | 85/8.8 |
| 3,972,110 A | * | 8/1976 | Sasena | 29/452 |
| 4,018,425 A | * | 4/1977 | Sasena | 256/54 |
| 4,207,014 A | * | 6/1980 | Worrallo | 403/187 |
| 4,234,094 A | * | 11/1980 | Jorgensen | 211/88 |
| 4,927,306 A | * | 5/1990 | Sato | 411/182 |
| 6,176,471 B1 | * | 1/2001 | Naegele et al. | 256/24 |

* cited by examiner

*Primary Examiner*—Beth A. Stephan
*Assistant Examiner*—Yaoko Slack
(74) *Attorney, Agent, or Firm*—Knobbe, Martens, Olson & Bear, LLP

(57) ABSTRACT

The present invention relates to a fastening technique for installing grille panels in frame sections that is faster and more secure and does not require tools. The grille is effectively secured against detachment from the frame, as the grille connectors are positively prevented from being pulled out of the grooves. Consequently, large pushing, pulling and detachment forces can be exerted on the grille without damaging the grille connectors.

19 Claims, 5 Drawing Sheets

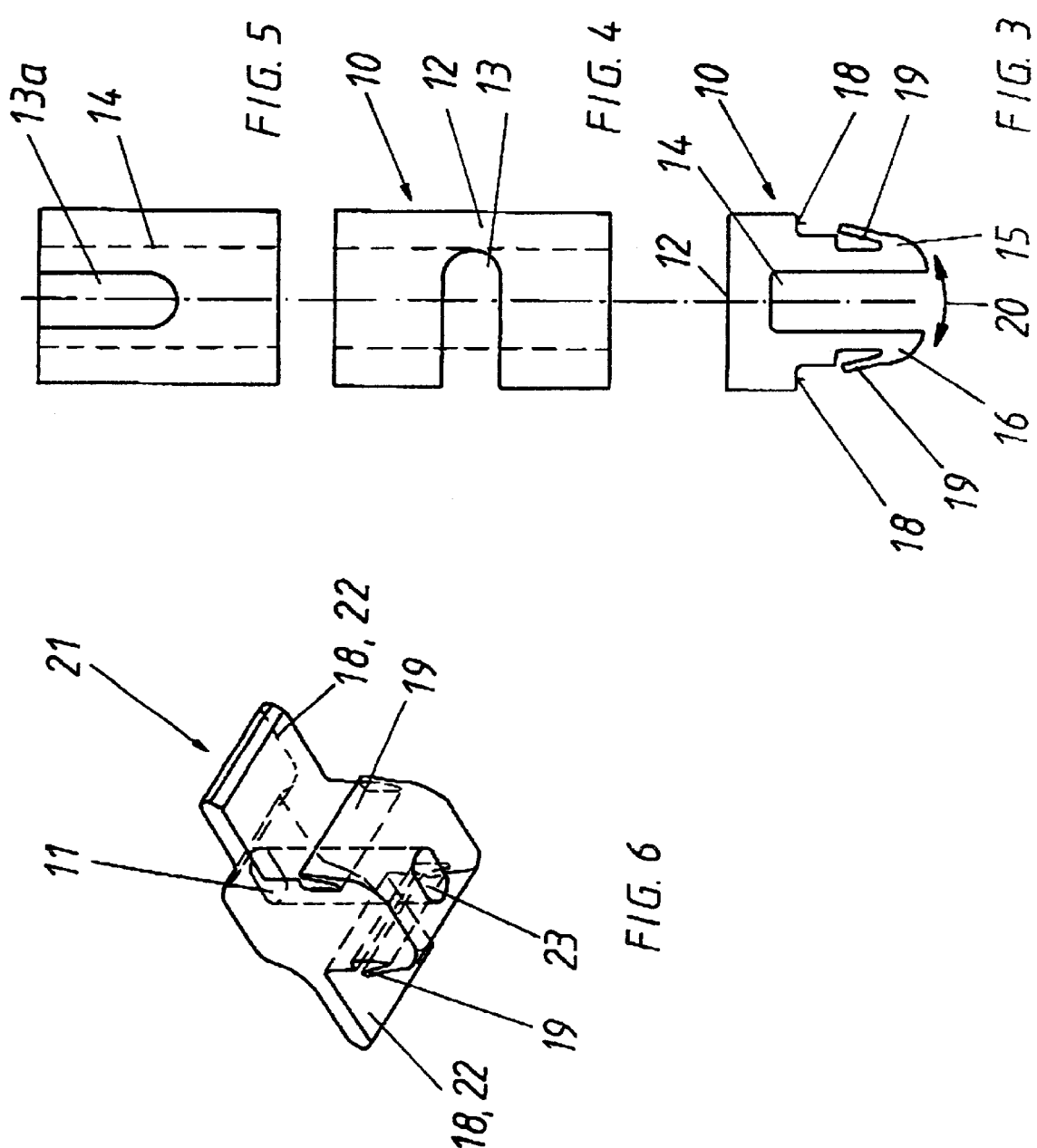

ARRANGEMENT FOR FASTENING A GRILLE IN A FRAME SECTION

FIELD OF THE INVENTION

The subject-matter of the invention is an arrangement for fastening a grille in a frame section.

BACKGROUND OF THE INVENTION

A clamp arrangement for fastening a grille type fencing panel to a fence-post is known from EP 0481100 B1. For this purpose the fence post is provided with a corresponding undercut into which a fastener is slipped and fenced by means of a screw. The fastener then carries a horizontal bar of the grille panel.

However, it is not possible to attach such a grille to a frame section of a built-up frame with this known arrangement.

A clip-on attachment for holding articles on grilles that is suitable only for releasable attachment to bars of the grille is known from the subject-matter of EP 0567804 A1. However, there is no indication as to how the grille as a whole can be connected to a surrounding frame section with such an attachment.

Therefore it is the fundamental problem of the invention to design an arrangement for fastening a grille to a surrounding frame so that the grille can be quickly and securely fastened with the simplest possible means, and above all without tools.

SUMMARY OF THE INVENTION

For the solution of this problem, the invention is characterized by the technical teaching of claims 1, 9 and 12.

The essential feature of the invention is that, in order that a grille may be fastened in a frame section, the frame is required to comprise strut sections with grooves with undercuts and a grille connector which is releasably connected to at least one bar of the grille is clippable into the respective frame section groove.

This technical teaching yields the considerable advantage that a clippable grille connector is now proposed which is slipped on to at least one bar of the grille and then anchored.

In a first preferred configuration, the grille connector is intended for fastening only one bar of the grille. The grille connector is at least partly transfixed by this bar, which may be either the horizontal or the vertical bar of the grille, so that the bar is carried by the connector and thereby fastened in the groove in the strut section, in a releasable manner.

In a second embodiment of the invention, the grille connector is releasably mounted on two grille bars which are perpendicular to each other, carries these, and again is clippable into the groove in the frame section, in a releasable manner.

In a third embodiment, the grille connector comprises two hinged halves between which a recess is formed so that at least one bar of the grille can be held between the halves.

The grille connector is fastened to the grille bar by first of all spreading open the connector to expose the central recess, placing it in the open condition around the grille bar, and then closing it. In this closed condition, the grille connector is then pushed into the undercut groove in the strut section and snapped into place.

In a first preferred configuration, the snap engagement of the grille connector in the undercut groove In the frame section is produced as follows: snap-in limbs integrally joined to the grille connector have springy lateral extensions which abut against the undercuts of the groove in the frame section and are jammed. This is a non-releasable connection, that is to say the grille connector cannot be pulled upwards out of the groove "against its insertion direction" because the springy limbs abut against the undercuts of the groove.

In a second configuration of the invention, instead of the springy lateral projections, disk-shaped elastically deformable snap projections are provided on the snap-in limbs. When the grille connector is pushed into the groove, these projections are at first elastically deflected. On reaching the undercut in the groove, they spread apart and likewise abut against the back of the undercut. In this case, if sufficient pulling force is exerted, the grille connector can be pulled out of the groove. This force may be such that a tool is necessary.

In the case of the first-mentioned embodiment, however, installation (or assembly) entirely without the use of tools is preferred.

If, in the first-mentioned embodiment, it is necessary to remove the grille connector, the frame section can be dismantled and the grille connector can be slid along the groove until it reaches the groove opening, where it can be extracted The intended application of the present invention is the provision of framed grille panels which can be used for every possible kind of guard or barrier. Preferred applications for such framed grille panels are in machine shops, where access to particular machines must be barred, but without obstructing visibility; in other words, machine "cages" that need to be particularly easy to dismantle and transport.

Such grille panels framed with surrounding frame sections can also be used for other barrier applications, e.g. for entrances to public buildings, or for changing cubicles, etc. Complete entrances, which are easily transported and erected, can be provided for sports stadiums or other large public buildings; they all meet the requirement that the grille panels should be easily removable and replaceable with other kinds of grille panels when the frame section is opened.

However, the invention is not limited to the use of grille panels in conjunction with the grille connectors indicated. Instead of each grille connectors being releasably connected to at least one bar of a grille, lugs in the form of bars or plates attached to solid panels can take the place of the grille bar. Such solid panels may be wall panels made of plastic, wood, paper, cardboard or the like. Sandwich panels can also be used, provided they have projections adapted for being releasably held in a frame section by a grille connector into which they engage and which in turn is releasably pressed into the groove of a surrounding frame section.

The term "surrounding frame section" must of course be given a wide interpretation: it is not essential for the frame section to extend all round; the frame may be formed from as few as two struts set perpendicularly to each other or at an angle to each other. The grille is then held between these strut sections and forms the in fill of the bay which they define.

The subject-matter of the present invention follows not only from the individual claims [considered separately], but also from the individual claims considered in combination.

All details and features disclosed in the documents, including the Abstract, and in particular the configuration illustrated in the drawings, are claimed as essential to the invention in so far as, considered separately or In combination, they are novel in relation to the state of the art.

BRIEF DESCRIPTION OF THE DRAWINGS

The invention will now be described in detail with reference to drawings showing a number of ways of carrying it out. Further features essential to the invention and advantages of the invention will become apparent from the drawings and the description.

FIG. 3 is a side view of a grille connector, FIG. 4 is a top view of the grille connector of FIG. 3, FIG. 5 shows a grille connector which is a modified form of the connector of FIG. 4, FIG. 6 shows a grille connector which is a modified form of the connectors of FIGS. 3 to 5.

DETAILED DESCRIPTION OF THE INVENTION

Figure 1:
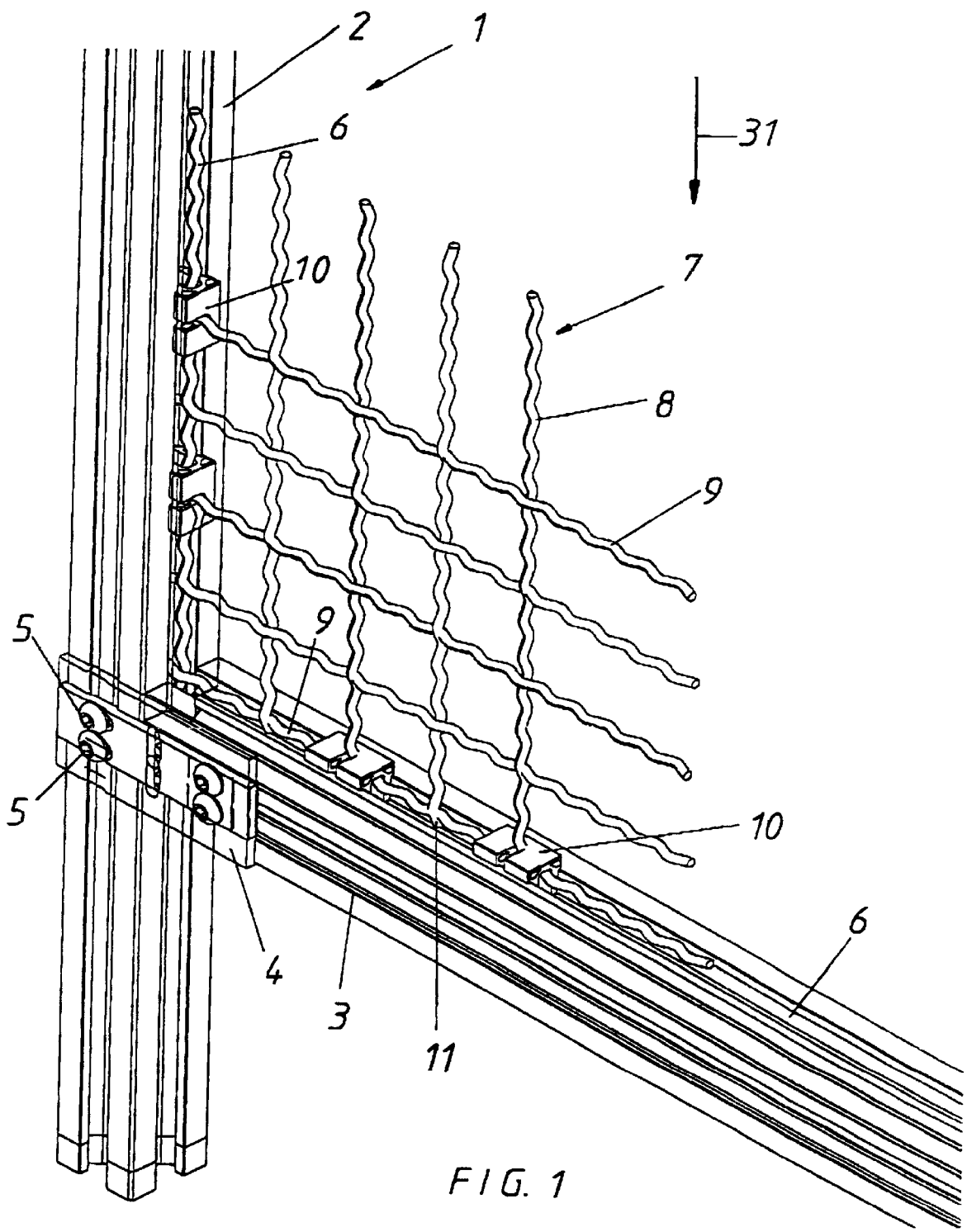
FIG. 1 shows an elevation, in perspective, of grille connectors according to the invention in a first embodiment.
Figure 2:
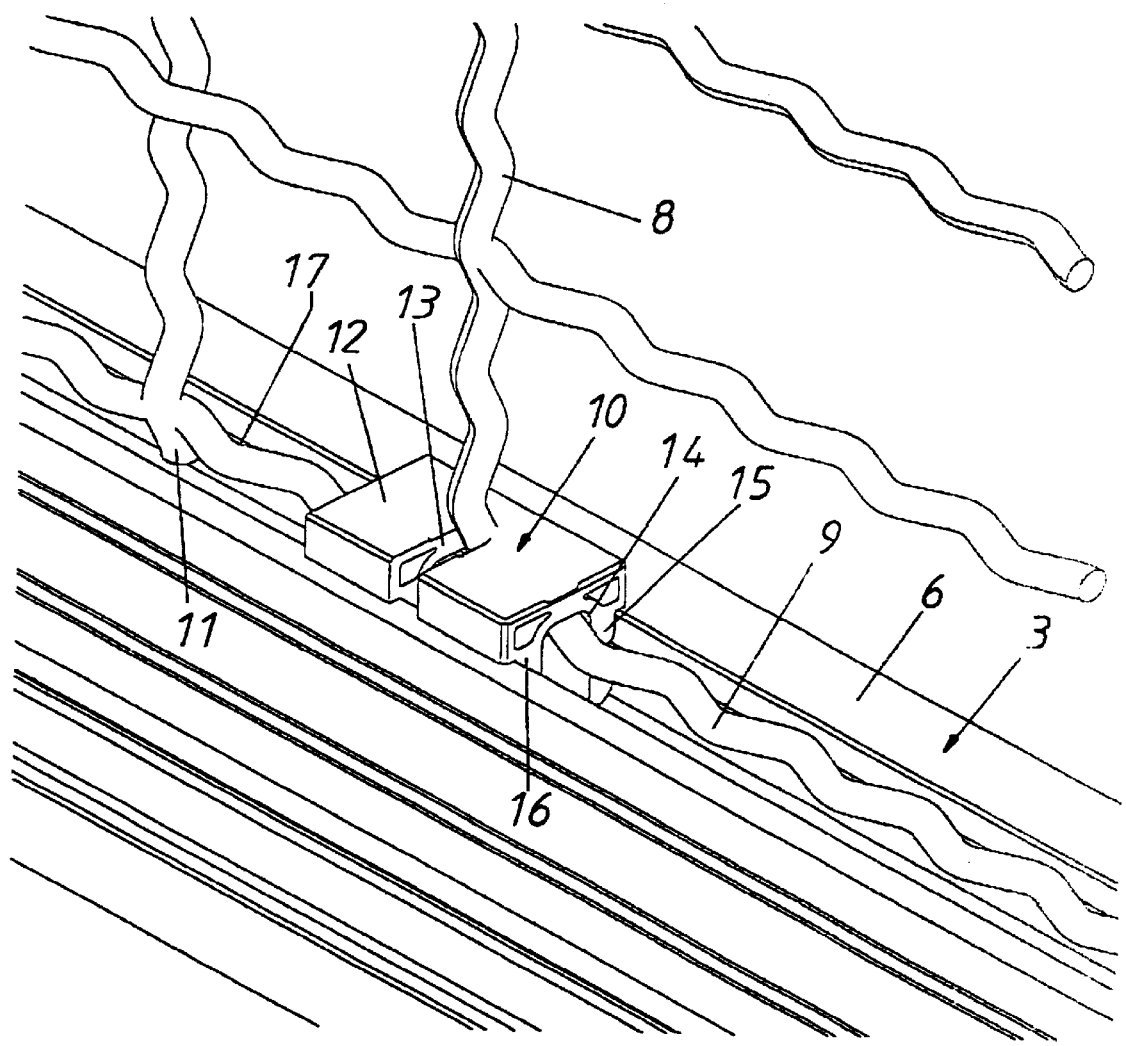
FIG. 2 is the view of FIG. 1 on an enlarged scale.

As schematically illustrated in FIGS. 1 and 2, a frame section 1 comprises at least two strut sections 2, 3 extending perpendicularly to one another and joined together in a manner known in itself by a connector 4.

Here the connector 4 is in the form of a plate and is [attached] by means of screws 5 screwed [into] undercut grooves of the strut sections 2, 3. The invention is of course not limited to this arrangement, as any frame section can be used and the struts 2, 3 need not be set at right angles to each other but at may be a fined at any desired angle to each other. All that matters is that the struts 2, 3 define between them a bay which is to be filled in with a grille 7 in accordance with the invention. This grille 7 will be fastened and anchored in the respective groove 6 in the strut sections 2, 3, without the use of a tool, by means of grille connectors 10 clipped into the respective groove 6.

In the embodiment illustrated in FIGS. 1 and 2, each grille connector 10 is mounted for releasable attachment both on a vertical grille bar 8 and on a horizontal grille bar 9, in other words at points where two grille bars 8, 9 cross.

To make the fastening even stronger, the vertical bars 8 of the grille are preferably extended downwards by extra lengthenings 11 which likewise engage in the groove 6.

For simplicity's sake only the lower attachment of the grille 7 in the lower horizontal section groove 6 will be described in the present example. Obviously, the commentary also applies to the perpendicularly extending groove 6 in the vertical strut section 2.

FIG. 2 shows on an enlarged scale a grille connector 10 which is preferably made in one piece from plastic material and which has a cap 12 across which a transverse slit 13 transversely extends to a point some way beyond the middle.

Two spaced-apart snap-in limbs 15, 16, which define a longitudinal recess 14 between them, extend towards and into the groove 6.

As illustrated in FIG. 2, the grille connector 10 is mounted on the horizontal grille bar 9 at a point where the grille bars 8, 9 cross, so that the vertical bar passes through the transverse slit 13.

The longitudinal recess 14 and the slit 13 are formed so that both bars 8, 9 are accommodated with slight play. Once a row of similar grille connectors have been mounted at crossing points of the grille, the grille 7 as a whole can be moved downwards in the direction of the arrow 31 towards the horizontal strut section 3 so that the entire grille 7 engages in the groove 6. The grille connectors 10 which are left sitting in the raised position are then pressed down, in succession, by hand, so that the snap-in limbs 15, 16 with their springy extensions 19 (see FIG. 3) snap into the undercut 17 of the section groove 6.

In a similar manner the grille 7 is also snapped into the groove 6 in the vertical strut section 2.

Further details of the construction of this type of grille connector 10 are revealed in FIG. 3.

It will be seen that the longitudinal recess 14 serves not only to accommodate the horizontal grille bar 9 but also to afford the snap-in limbs 15, 16 some elastic play in the direction of the arrows 20. These limbs are therefore springy, and they carry on their outward faces springy extensions 19 which are preferably integrally joined to the snap-in limbs 15, 16.

On the underside of the body of the grille connector 10 are stop faces 18 by which the grille connector according to FIG. 2 rests on the outer faces of the section groove 6 and is locked in position.

The top view in FIG. 4 shows how the transverse slit 13 extends beyond the centre of the grille connector.

FIG. 5 shows, in a modified form, that the slit 13 does not necessarily extend transversely with respect to the longitudinal axis of the grille connector 10 of FIG. 4; it can also extend parallel with the longitudinal axis, as shown in FIG. 5 in the form of the slit 13a.

FIG. 6 shows, as a further embodiment, a grille connector 21 which has laterally projecting wings 22 by which it rests on the outer face of the section groove 6. Larger stop faces 18 are thereby formed underneath the wings 22.

A further difference which is revealed is that there are no springy snap-in limbs 15, 16, but only the springy extensions 19 arranged on a solid body. These extensions 19 themselves have the necessary freedom of movement to be able to be snapped behind the undercut 17 of the groove 6.

Yet another difference that is revealed is that the grille connector 21 serves only to accommodate the extension 11 of a vertical grille bar 8 in a through hole 23. This extension 11, therefore, engages in the through hole 23.

Figure 7:
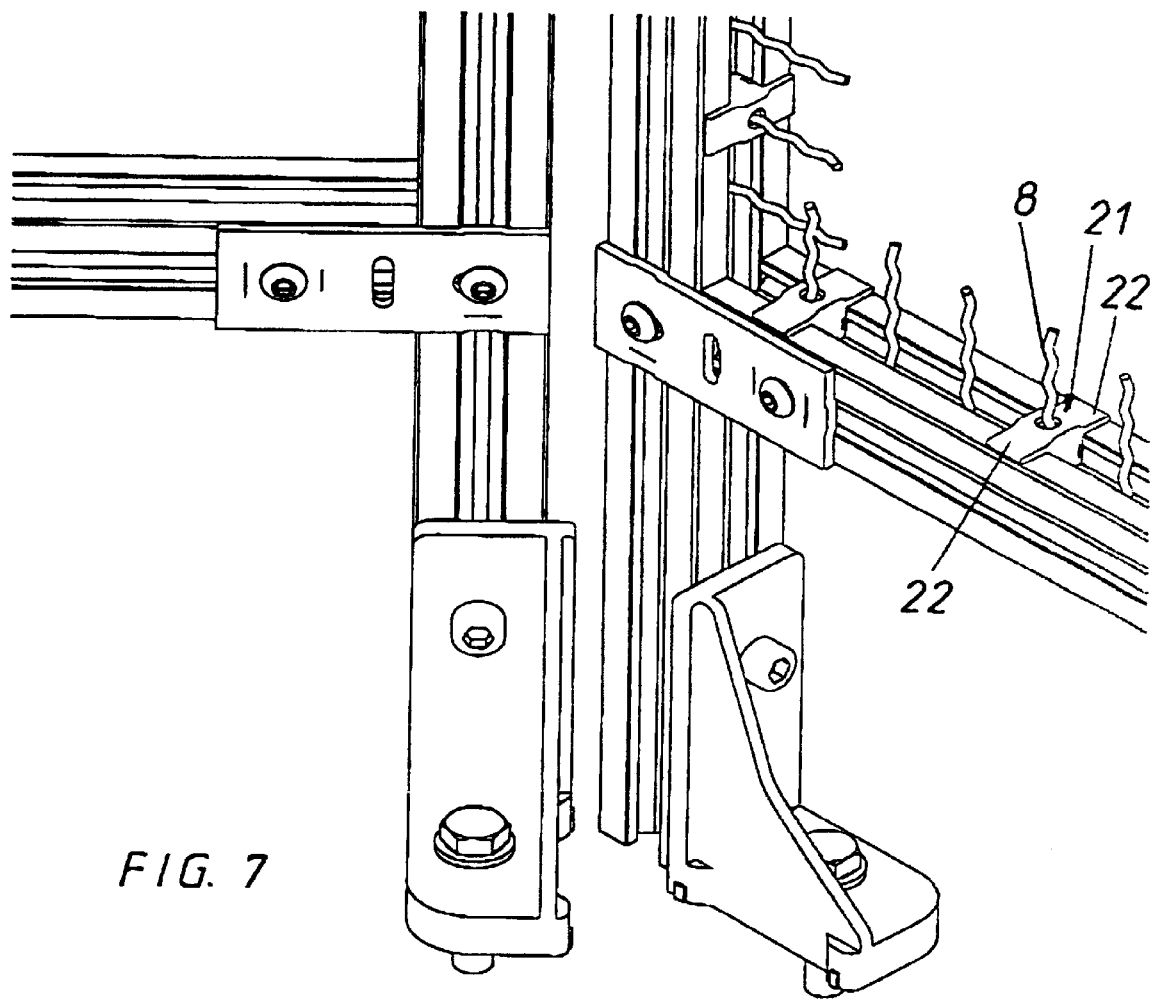
FIG. 7 shows a grille connector according to FIG. 6 in situ in a grille panel.

FIG. 7 shows such a grille connector 21 in situ, it will be seen that only grille bars 8 extending perpendicularly to the section groove 6 engage in the through hole 23 and are held therein.

With this embodiment, the procedure is as follows. Grille connectors 21 are placed in grooves 6 in strut sections 3 at appropriate intervals to form the fixing points for a grille. The method for fastening the grille is then as follows. The ends of the bars 8, 9 of a grille 7 are inserted into the through holes 23 in the grille connectors 21 and the grille is thereby fixed in place. Subsequently, strut sections 3 with grille connectors 6 [sic] placed therein are arranged at free ends of grille bars 8, 9 so that the ends of the grille bars are clasped and fixed in place by the through holes 23.

Figure 9:
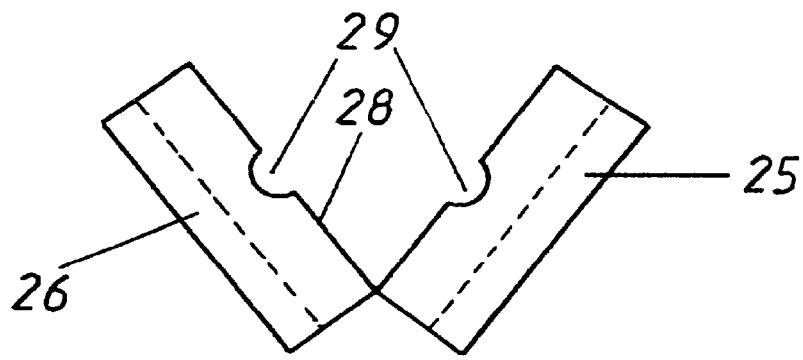
FIG. 9 shows the grille connector of FIG. 8, in the spread pen condition.
Figure 8:
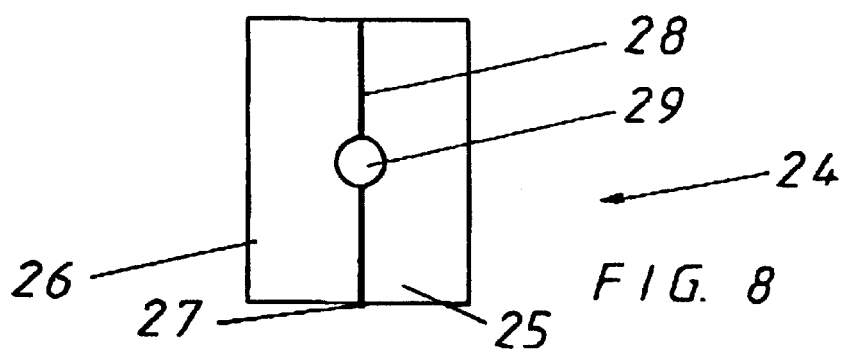
FIG. 8 is a top view of another modification of a grille connector in a hinged embodiment.

As a further embodiment, FIGS. 8 and 9 show that the opening 29 to receive the individual grille bar 8 can also be split.

Here, the grille connector 24 comprises two connector parts 25, 26 which are joined together along one edge of a parting plane 28 by a film hinge 27. The retaining opening 29 is located in the region of the parting plane 28. The grille connector 24 is placed adjacent to a grille bar 8 in the open condition as shown in FIG. 9, and is then closed. Additional snap-fastening elements may be arranged between the two connector parts 25, 26 so that it then remains closed.

The entire grille with connectors 24 mounted thereon is then inserted into the groove 6 and the grille connector 24 is moved downwards in the direction of the arrow 31, causing the snap fastening—according to either FIG. 3 or FIG. 6—to snap into the corresponding groove 6.

Figure 11:
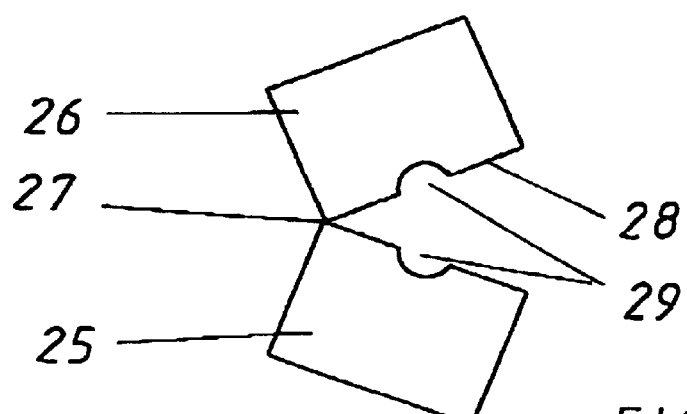
FIG. 11 shows the arrangement according to FIG. 10, in the spread-open condition.
Figure 10:
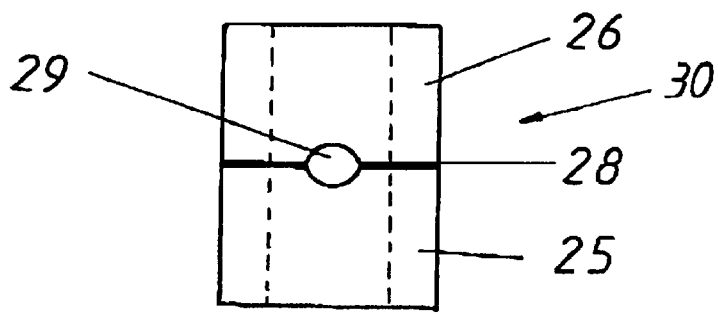
FIG. 10 shows an embodiment which is a modified form of the connector of FIG. 8.

FIGS. 10 and 11 show that the parting plane 28 of a grille connector 30 need not necessarily extend parallel with the longitudinal axis of the groove 6. This parting plane 28 may also be made to extend perpendicularly to the longitudinal axis of the groove 6, so that the grille connector 30 is opened and closed perpendicularly to the longitudinal axis of the groove 6.

Figure 12:
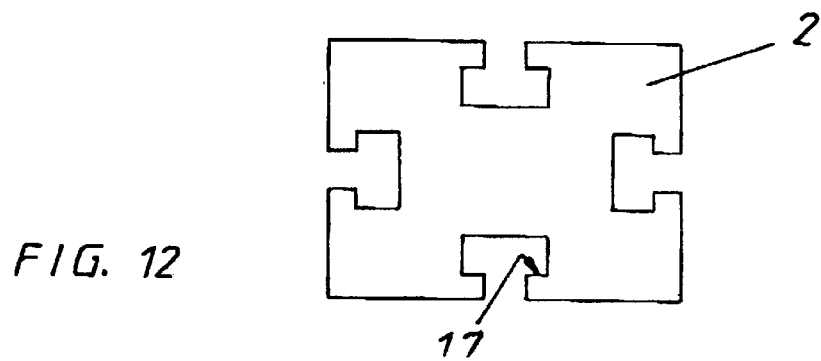
FIG. 12 shows a possible cross-section through a frame strut.

FIG. 12 shows a possible strut cross-section. The undercut 17 is clearly revealed.

Taken as a whole, the novel fastening technique provides a way of installing grille panels in frame sections that is rapid and secure, and above all can be carried out without tools. The grille is effectively secured against detachment from the frame, as the grille connectors 10, 21, 24, 30 are positively prevented from being pulled out of the grooves. Consequently, large pushing, pulling and detachment forces can be exerted on the grille without damaging the grille connectors 10, 21, 24, 30.

DRAWING LEGEND 1. frame section
2. strut section
3. ditto
4. connector
5. screw
6. section groove
7. grille
8. grille bar
9. ditto
10. grille connector
11. extension
12. cap
13. slit 13a
14. longitudinal recess
15. snap-in limb
16. ditto
17. undercut
18. stop face
19. springy extension
20. arrow direction
21. grille connector
22. wing
23. through hole
24. grille connector
25. connector part
26. ditto
27. film hinge
28. parting plane
29. retaining opening
30. grille connector
31. arrow connection

What is claimed is:

1. A method for fastening a grille in a frame section, comprising:

arranging a predetermined number of grille connectors on bars of a grille; and inserting the entire grille complete with the mounted grille connectors into a section groove of the frame section.

2. The method of claim 1, further comprising engaging the grille as a whole in the section groove and pushing the grille connectors into the groove in succession.

3. The method according to claim 2, further comprising arranging elastically deformable snap projections on the snap-in limbs, elastically deflecting the grille connector when pressed into the section groove, and upon reaching an undercut in the section groove spreading apart and abutting against the back of the undercut.

4. The method according to claim 3, further comprising configuring the snap-in limbs so that the snap-in limbs afford elastic play and have on lateral surfaces the snap projections.

5. The method according to claim 1, further comprising fastening a bar in a releasable manner in the groove in the frame section; wherein the grille connector is at least partly transfixed by the grille bar so that the bar is carried by the connector.

6. The method according to claim 1, further comprising spreading the connector open to expose a central recess, placing the connector in the spread-open condition around the grille bar, and closing the connector in order to fasten a grille connector to the grille bar.

7. The method according to claim 1, further comprising mounting the grille connector on a horizontal grille bar at a point where the grille bars cross, with a vertical grille bar passing through a transverse slit.

8. The method according to claim 1, further comprising extracting the grille connector from the section groove when a sufficient pulling force is applied.

9. A method for fastening a grille in a frame section, comprising:

providing a plurality of grille connectors, each grill connector having a body with an upper part and a lower part, laterally projecting wings in proximity of the upper part of the body, and a through hole extending between the upper part and the lower part of the body;

placing the grille connectors in grooves of strut sections at appropriate intervals to form fixing points for a grille within the frame section, wherein the projecting wings rest on outer faces of the grooves; and inserting ends of bars of the grille into the through holes.

10. A device for fasten in grille in a frame section, comprising:

a body with an upper part and a lower part, the body being formed with a longitudinal recess to accommodate a first bar of the grille and transverse slit to accommodate a second bar of the grille; and a springy extension arranged on the lower part of the body, wherein the lower part is configured to fit into a groove of a strut section and wherein the springy extension is configured to cooperate with undercuts within the strut section.

11. The device according to claim 10, wherein the body is configured to clip into the groove.

12. The device according to claim 10, wherein the body is releasably connectable to a bar of the grille.

13. The device according to claim 10, further comprising snap-in limbs at the lower part of the body, wherein the snap-in limbs are integrally joined to the body.

14. The device according to claim 12, wherein the springy extensions are provided on opposite sides of the snap-in limbs, wherein the springy extensions abut against the undercuts of the groove in the frame section and are jammed.

15. The device according to claim 10, wherein the grille connector is made of plastic material.

16. A device for fasten in a grille in a frame section, comprising:
- a body with an upper part and a lower part, the body having a receptacle to receive an end bar of the grille, wherein the body is configured to be releasably mounted on two bars of the grille which are perpendicular to each other; and
- a springy extension arranged on the lower part of the body, wherein the lower part is configured to fit into a groove of a strut section and wherein the springy extension is configured to cooperate with undercuts within the strut section.

17. A device for fastening a grille in a frame section, comprising:
- a body with an upper part and a lower part, the body having a receptacle to receive an end of a bar of the grille, wherein the body comprises two connector parts which are hingedly connected to each other; and
- a springy extension arranged on the lower part of the body, wherein the lower part is configured to fit into a groove of a strut section and wherein the springy extension is configured to fit into a groove of a strut section and wherein the springy extension is configured to cooperate with undercuts within the strut section.

18. The device according to claim 11, wherein a recess is formed between the two connector parts, wherein the recess is adapted to receive at least one bar of the grille.

19. A device for fastening a grille in a frame section, comprising:
- a body with an upper part and a lower part, the body having a receptacle to receive an end of a bar of the grille;
- a springy extension arranged on the lower part of the body, wherein the lower part is configured to fit into a groove of a strut section and wherein the springy extension is configured to cooperate with undercuts within the strut section; and
- snap-in limbs at the lower part of the body, wherein the snap in limbs are integrally joined to the body, and wherein the snap-in limbs have a cap across which a transverse slit transversely extends to a point some way beyond the middle.

* * * * *